United States Patent [19]

Bain

[11] Patent Number: 4,866,771
[45] Date of Patent: Sep. 12, 1989

[54] SIGNALING SYSTEM
[75] Inventor: Walter F. Bain, Lovettsville, Va.
[73] Assignee: The Analytic Sciences Corporation, McLean, Va.
[21] Appl. No.: 5,206
[22] Filed: Jan. 20, 1987
[51] Int. Cl.[4] .................. H04K 1/00; H04B 15/00; H04L 27/10
[52] U.S. Cl. ................................. 380/23; 375/1; 375/9; 375/45; 375/65
[58] Field of Search ............... 380/23; 375/9, 45, 65, 375/1

[56] References Cited

U.S. PATENT DOCUMENTS

| | | |
|---|---|---|
| 2,401,403 | 6/1946 | Bedford . |
| 2,401,406 | 6/1946 | Bedford . |
| 2,419,568 | 4/1947 | Labin . |
| 3,067,280 | 12/1962 | Schlafly . |
| 3,411,089 | 11/1968 | Gicca . |
| 3,746,994 | 7/1973 | Kramer ........................ 375/9 |
| 3,932,704 | 1/1976 | Bodony ........................ 375/65 |
| 3,991,271 | 11/1976 | Branscome . |
| 4,090,135 | 5/1978 | Farstad et al. ............... 375/45 |
| 4,126,761 | 11/1978 | Graupe . |
| 4,172,968 | 10/1979 | Steinberg . |
| 4,185,241 | 1/1980 | Ewanus . |
| 4,276,652 | 6/1981 | McCalmont . |
| 4,317,209 | 2/1982 | Barthelme . |
| 4,319,087 | 12/1982 | Varsos . |
| 4,324,002 | 4/1982 | Spilker . |
| 4,361,729 | 11/1982 | Barnes . |
| 4,363,130 | 12/1982 | Ramsey . |
| 4,383,323 | 5/1983 | Timor . |
| 4,425,661 | 1/1984 | Moses . |
| 4,434,322 | 2/1984 | Ferrell . |
| 4,468,667 | 8/1984 | Baylor . |
| 4,538,136 | 8/1985 | Drabing ....................... 375/65 |

OTHER PUBLICATIONS

Mashbits et al. "FSK Signaling Generation Using a Reference Oscillator with Fixed Parameters" *Telecommunications*, vol. 24, No. 8, 1970, pp. 7-12.

Primary Examiner—Stephen C. Buczinski

[57] ABSTRACT

Periodic components of a data signal are generated from a periodic original signal in a manner to cause the periodic components to represent not only the data but also information about characteristics of the original signal; subsequently both the data and the information about the original signal characteristics are derived from the periodic components. The periodic components of a data signal are generated at frequencies within a frequency band and in a manner such that the components precisely define a fixed frequency outside the spectral band. Unauthorized access to a device (of the kind that receives data in the form of a data signal having periodic components) is detected by generating the periodic components using a modulation scheme, involving no encryption, whereby the data may be recovered from the data signal directly by demodulation even by an unauthorized party; imparting inherent authentication information to the periodic components; and permitting authorized access and detecting unauthorized access on the basis of the inherent authentication information.

9 Claims, 3 Drawing Sheets

SIGNALING SYSTEM

BACKGROUND OF THE INVENTION

This invention relates to systems in which data is represented by signals having periodic components.

A binary frequency shift-keyed modulation scheme, for example, may represent a data bit by one of two pre-established frequencies: a "mark" frequency for a bit having a "1" value; and a "space" frequency for a "0" valued bit. The mark and space frequencies may be generated by an analog voltage controlled oscillator, and their values are chosen to be within the passband of the channel When the channel is a telephone line and the information is being sent to a computer, techniques are often used to detect unauthorized access to the computer.

For example, The person seeking access may be required to send a simple password, or to encrypt the information bits before transmission, or to send a separate identification bit stream. Alternatively the receiving device may dial back the sender to confirm that the planned access is authorized.

Where the channel bandwidth is adequate, spread spectrum systems may be used. The original signal to be sent is first modulated by a pseudo-random masking sequence to include many more frequency components than the original signal. The additional frequency components are spread out in the vicinity of the center frequency of the original signal. The receiver performs the inverse of the pseudo-random masking sequence on the received signal to recover the original signal.

SUMMARY OF THE INVENTION

A general feature of the invention is in generating the periodic components of a data signal from a periodic original signal in a manner to cause the periodic components to represent not only the data but also information about characteristics of the original signal, and subsequently deriving, from the periodic components, both the data and the information about the original signal characteristics.

Preferred embodiments of the invention include the following features. The original signal has a known base frequency, and the information about the original signal characteristics includes the fact that the periodic components were generated from an original signal at the known base frequency. In some embodiments, the periodic components of the data signal have different frequencies in a frequency shift keyed modulation system. In some embodiments, the periodic components of the data signal have different phases in a phase shift keyed modulation system. In some embodiments, the original signal has, at a given time, one of a plurality of known base frequencies, and the information about the original signal characteristics includes the identity of the base frequency of the original signal at the given time. The modulator applies a predetermined transformation to the original signal to generate said data signal, and the analyzer applies the inverse of the transformation to the data signal to derive the signal characteristic information. The transformation includes frequency division by at least one preselected value, and the inverse of the transformation includes frequency multiplication by the preselected value. In some embodiments, the data comprises a bit stream, the data signal has two periodic components at two fixed frequencies, and the modulator generates the two periodic components by binary frequency shift keying based on the bit stream. The modulator divides the frequency of the original signal components by either of two integers (M and N) corresponding to "1" valued and "0" valued bits in the bit stream. A harmonic generator generates harmonics of the data signal components including the Mth and Nth harmonics, and the output of the harmonic generator is filtered in a narrow passband at the known base frequency. The modulator generates the data components digitally from the original signal components. An analyzer determines the authenticity of the data signal based on information about the original signal characteristics. A bandlimited channel is connected between the modulator and the demodulator, the frequency band of the data signal being within the passband of the channel, the original signal base frequency being outside the passband.

Another general feature of the invention is in generating the periodic components of a data signal at frequencies within a frequency band and in a manner such that the components precisely define the frequency and phase of an original signal having a frequency or frequencies outside the frequency band.

Another general feature of the invention is a system for detecting unauthorized access to a device of the kind that receives data in the form of a data signal having periodic components; the periodic components are generated by a modulation scheme involving no encryption, whereby the data may be recovered from the data signal directly by demodulation even by an unauthorized party; inherent authentication information is imparted to the periodic components; and authorized access is permitted and unauthorized access is detected on the basis of the inherent authentication information.

DESCRIPTION OF THE PREFERRED EMBODIMENT

We first briefly describe the drawings.

STRUCTURE AND OPERATION

Figure 1:
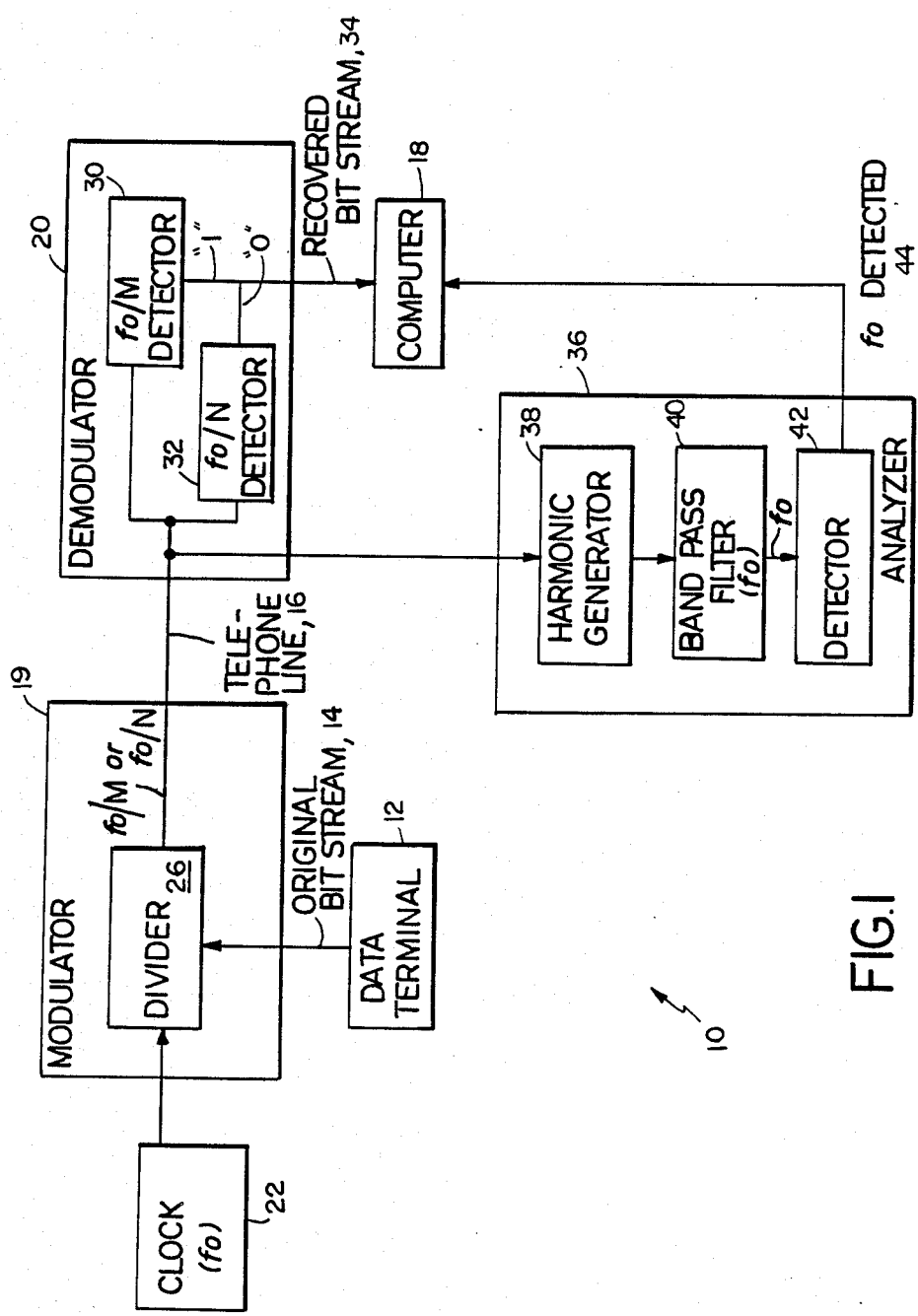
FIG. 1 is a block diagram of a binary frequency shift keyed data communication system.

Referring to FIG. 1, in a data communication system 10 a data terminal 12 generates an original bit stream 14 of data for delivery over a telephone line 16 to a remote computer 18. A modulator 19 associated with terminal 12 produces a binary frequency shift keyed (FSK) signal based on the successive bits in stream 14. A demodulator 20 at the computer end of the telephone line recovers the original bit stream from the FSK signal and delivers it to the computer.

Modulator 19 is connected to the pulse output of a digital clock 22 (called the original signal) operating at a frequency $f_o$ (called the original frequency). The clock pulses are fed to a digital divider 26 (e.g., Radio Shack 74 LS161 available from Tandy Corporation, Fort Worth, Texas). By suitably configuring its load inputs, divider 26 is caused to divide the frequency of the clock pulses by a predetermined integer M when a "1" valued bit appears in stream 14 and by a Predetermined integer N when a "0" valued bit appears in stream 14. The output of divider 26 is connected to telephone line 16. (Modulator 19 also includes other conventional circuitry —not shown—of the kind typically used in modems).

As a result, when a "1" valued bit appears in stream 14, the telephone line signal exhibits a mark frequency $f_o/M$. Conversely, in response to a "0" valued bit the line signal exhibits a space frequency $f_o/N$.

The bits of original bit stream 14 appear at a bit rate $f_b$. Modulator 19 has a telephone line signaling rate of $f_s$ equal to $f_b$.

Demodulator 20 includes two detectors, an $f_o/M$ detector 30, and an $f_o/N$ detector 32. For a signaling interval in which the data signal on telephone line 16 exhibits a mark frequency $f_o/M$, detector 30 delivers a "1" valued bit to computer 18. Conversely for a telephone line frequency of $f_o/N$, detector 32 delivers a "0" valued bit. Thus, the outputs of detectors 30, 32 together represent a recovered bit stream 34 that is the same as bit stream 14. (Demodulator 20 also includes other conventional circuitry—not shown—of the kind typically used in modems.)

The telephone line signal is also delivered to an $f_o$ analyzer 36. In analyzer 36, a harmonic generator 38 continually generates the harmonics of the telephone line signal including at least the Mth and Nth harmonics. The harmonics are filtered by a narrow bandpass filter 40 which passes only harmonics having a frequency at or very near to $f_o$. When the time averaged output level of filter 40 exceeds a preselected threshold, a detector 42 issues an $f_o$ DETECTED signal 44 to computer 18, indicating that the received mark and space frequencies are submultiples of a common original frequency $f_o$, and therefore that the transmitted mark and space frequencies were most likely generated by a common clock at the original frequency $f_o$.

Figure 2:
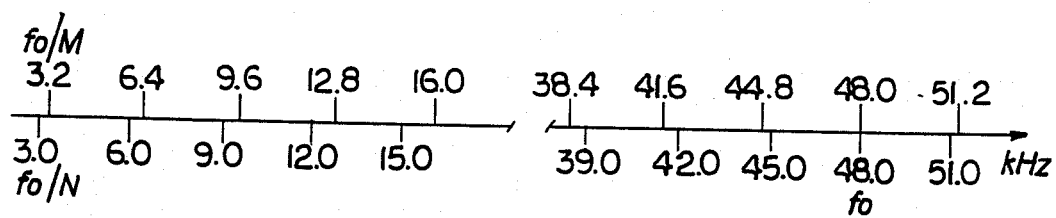
FIG. 2 is a graph of mark and space frequencies and their harmonics.

Referring also to FIG. 2, if clock 22 operates at $f_o=48.0$ kHz, for example, and if M=15 and N=16, then the mark frequency ($f_o/M$) is 3.2 kHz, and the space frequency ($f_o/N$) is 3.0 kHz. The harmonics generated by harmonic generator 38 are shown along the horizontal axis, with the mark frequency and its harmonics (6.4, 9.6, etc.) above the axis, and the space frequency and its harmonics below the axis. At 48.0 kHz ($f_o$) the space and mark harmonics coincide ($M \cdot f_o/M = N \cdot f_o/N = f_o$). Thus harmonic frequency $f_o$ appears at the output of filter 40 in every signaling interval, a circumstance that detector 42 uses as the basis for generating the $f_o$ DETECTED signal.

The mark and space frequencies lie within the passband of the telephone line; but $f_o$ lies outside the passband. Thus even though a signal of frequency $f_o$ could not be carried directly by the telephone line, the information that an original frequency $f_o$ was the common basis of the mark and space frequencies actually sent can be detected at the receiver.

Because the mark and space frequencies are generated digitally from a common fixed frequency digital clock 22 using divisors M and N, the ratios of the mark and space frequencies to each other and to the original frequency $f_o$ are fixed. For the same reason, there is a fixed phase relationship among clock 22 pulses and the mark and space signals. This is so because each mark signal pulse occurs at the same time as one of the $f_o$ clock pulses. Thus the difference (in time) between two mark signal pulses appearing respectively in two different signaling intervals can only occur in multiples of the clock interval ($1/f_o$), i.e., in multiples of $1/f_mM$ (where $f_m$ is the mark frequency, i.e., $Mf_m=f_o$), that is, in multiples of $T_m/M$ (where $T_m=1/f_m$ is the mark pulse interval). Therefore only differences (in terms of phase) that are multiples of $2\pi/M$ are possible (note that $T_m=2\pi$). Similarly phase offsets between two space signal pulses can occur only in multiples of $2\pi/N$. As a result the Mth harmonic of the mark frequency and the Nth harmonic of the space frequency have pulses that are strictly in phase with each other.

The phase coherence of the Mth harmonic of the mark frequency and the Nth harmonic of the space frequency permits the build-up in bandpass filter 40 of a single spectral line at $f_o$. Without this phase coherence the input signal to the filter would retain some modulation due to the original bit stream and most of its spectral energy would fall outside the narrow passband of filter 40 (FIG. 1). Accordingly, the $f_o$ DETECTED signal indicates not only the fact that the mark and space frequencies had the original frequency as their common basis, but also that they were generated in a phase coherent manner. Thus an unauthorized access, although done using the correct mark and space frequencies, will be detected if generated by a conventional analog VCO because of the phase incoherence of the VCO-generated frequencies.

As long as the $f_o$ DETECTED signal continues to appear, computer 18 treats bit stream 34 as being authentic and as having originated from a data terminal 12 that is authorized to communicate with computer 18. Otherwise, computer 18 stops treating bit stream 34 as authentic, alerts the operator that unauthorized access is being attempted, and may terminate the connection, or monitor and trace the unauthorized access.

Figure 3:
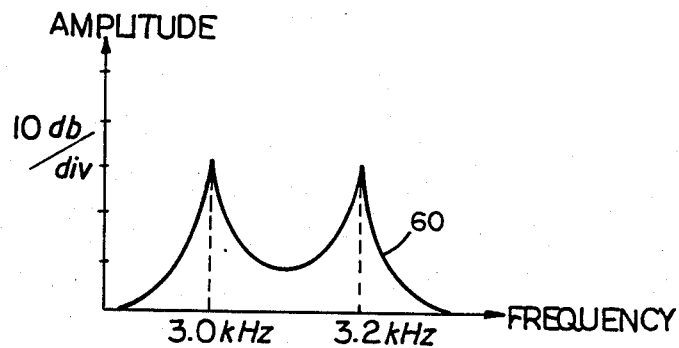
FIGS. 3, 4 are graphs of amplitude against frequency respectively for a line signal and the line signal after inverse processing at a receiver to recover the original signal.

Referring to FIG. 3, in an experimental laboratory implementation, the spectrum 60 of the FSK line signal is 500 Hz wide and centered at 3.1 kHz, exactly like the spectrum of Phase incoherent FSK of the same modulation index (6.67).

Figure 4:
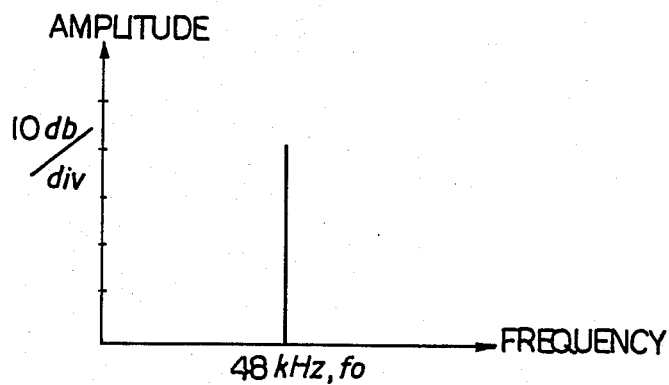

Referring to FIG. 4, the spectrum 62 of the output of filter 40 (FIG. 1) is a single spectral line at 48 kHz ($f_o$)

The invention makes it difficult for an unauthorized person to obtain access to computer 18. An authentic signal on line 16 generally appears the same as the signal of a conventional incoherent binary FSK scheme. By conventional demodulation the original bit stream may be recovered. The original bit stream is not encrypted; no passwords need appear on the line; and no separate identification bit stream is used. Thus an unsophisticated intruder would not even be aware that the line signal is of a kind that can be analyzed by the receiver for authenticity.

Other embodiments are within the following claims.

For example, the invention can be used with any system in which the line signal has frequency components such that there is a set of corresponding multipliers (fractional values or whole numbers) for which every product of a frequency component times its multiplier equals some original frequency ($f_o$), and for which every product of the phase of a signal component times its multiplier equals some multiple of $2\pi$ times the phase of the original frequency signal. Such a set of multipliers, if they exist, can be determined by solving the following 2L equations (where L is the number of frequency components of the signal):

$$M_i \omega_i = \omega_f, \quad i = 1, \ldots, L. \quad (1)$$

$$M_i \phi_i = (\phi_f)_{mod\, 2\pi}, \quad i = 1, \ldots, L. \quad (2)$$

where $\omega_i$ and $\phi_i$ are the angular frequency and phase of the ith signal component, and $\omega_f$ and $\phi_f$ are the angular frequency and phase of the original signal. By solving equation (1) for the $M_i$s, $\omega_f$ can then be determined. If those $M_i$s also satisfy equation (2), then the smallest submultiple of the $M_i$s which solve both equations (1) and (2) should be used. Any harmonic of $\omega_f$ could also be used. If equations (1) and (2) cannot all be satisfied, no unique $\omega_f$ exists and the system cannot be used.

Figure 5:
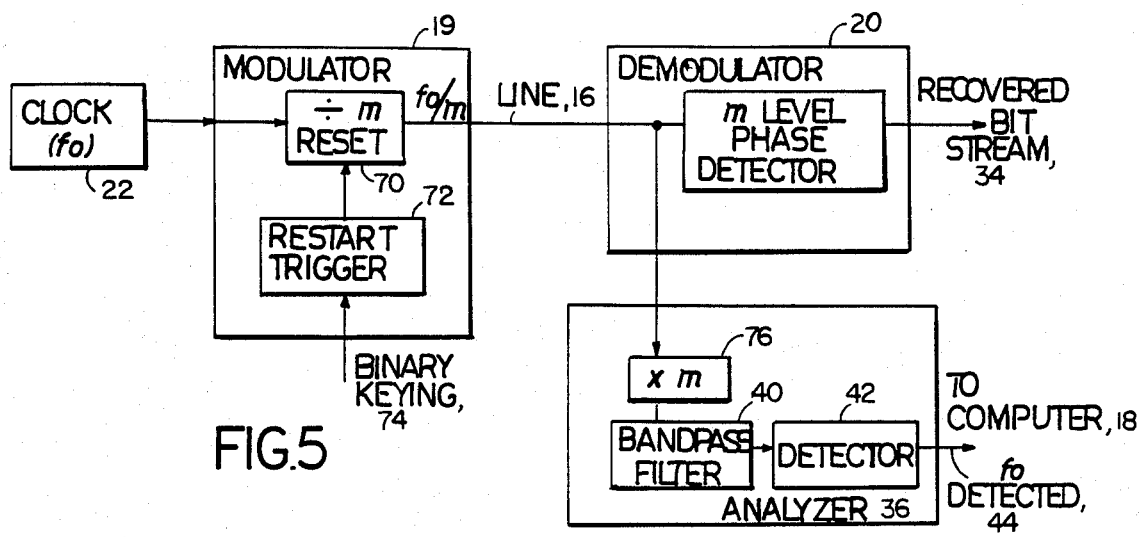
FIG. 5 is a block diagram of a phase shift keyed embodiment.
Figure 6:
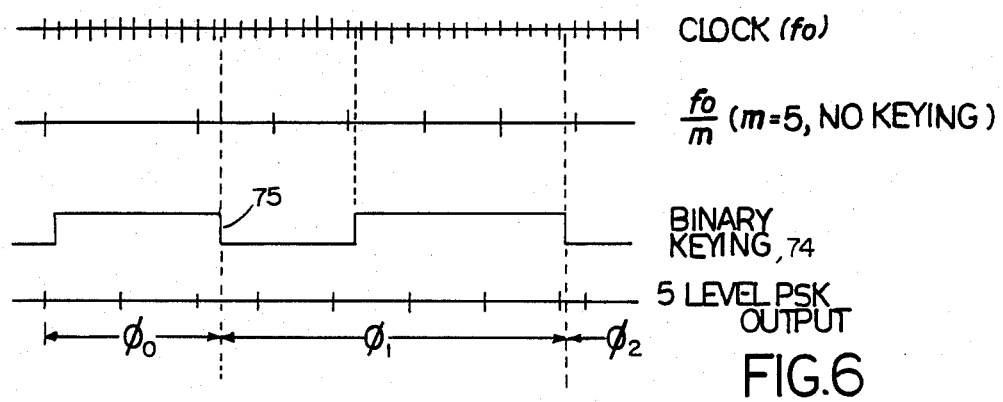
FIG. 6 is a timing diagram corresponding to FIG. 5.

The modulation scheme can be other than binary frequency shift keying, for example, m-level phase shift keying (PSK) modulation. Referring to FIGS. 5, 6, modulator 19 then includes a divider 70 which receives pulses from clock 22 (at $f_o$) and continually divides them by m. At each negative transition 75 of binary keying 74, divider 70 is restarted by a restart trigger 72. The timing of the transitions of the binary keying determines on which of the next m pulses of clock 22 the divider is restarted, thus providing m possible different phases. (In FIG. 6, $\phi_0$, $\phi_1$, $\phi_2$ ... represent successive phases.)

At the receiver, demodulator 20 has an m-level phase detector that derives the recovered bit stream. The line signal is also delivered to analyzer 36 where it is multiplied by m in a multiplier 76 (the inverse of the transformation—division by m—performed in modulator 19). The multiplied signal is passed to filter 40 and, if authentic, produces a single spectral line (at $f_o$) at the output of filter 40. Detector 42 then provides an $f_o$ DETECTED signal to computer 18, as in FIG. 1. The $f_o$ DETECTED signal indicates that the m different phases of the line signal were generated in a phase coherent manner from an original signal at frequency $f_o$.

One advantage of m-level PSK over the FSK approach is that, for a given bandwidth, PSK supports a higher keying rate than the FSK approach.

Multiple level frequency shift keying may also be used.

The modulated signal need not be transmitted to a remote location. It could, for example, simply be stored and subjected to authentication when retrieved.

Harmonic generator 38 could be replaced by a multiplier that multiplies only by both M and N, i.e., the inverse of the transformation (division by M or N) performed by the modulator 19.

The bit rate $f_b$ may be so fast that the line signal resembles noise without detracting from the ability to derive the original frequency $f_o$.

Other information besides authentication information may be conveyed by the system, for example, by shifting $f_o$ among different values at a supplemental signaling rate. The different values of $f_o$ may all lie outside the passband, thus establishing an additional "free" channel for carrying information. The analyzer 36 at the receiver would then include a set of bandpass filters 40, one for each value of $f_o$, and the supplemental channel information could be recovered from the outputs of the filter set.

Figure 7:
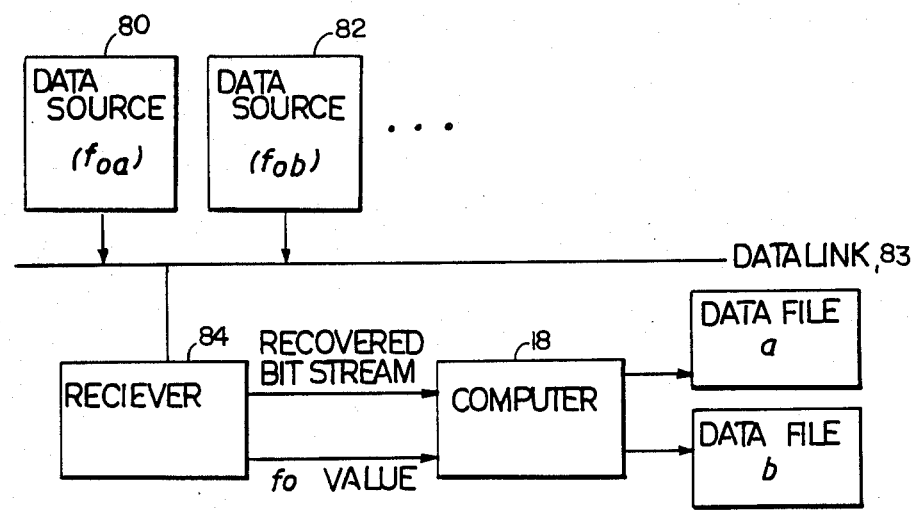
FIG. 7 is a block diagram of a system with multiple data sources and data files to which these can be given access.

Referring to FIG. 7, if computer 18 controls several different data files (e.g., DATA FILE a, DATA FILE b, etc.) access to a given file (e.g., an accounting file—DATA FILE a) may be restricted to only a preauthorized data source 80 by Providing source 80 with an original clock at a frequency $f_{oa}$ and all other data sources 82 with original clocks at other frequencies (e.g., $f_{ob}$). All data sources 80, 82 may communicate over a data link 83 with a receiver 84 associated with computer 18. Receiver 84 would include a demodulator as in FIG. 1 and an analyzer for each of the original clock frequencies being used. Each analyzer would have a bandpass filter with a passband frequency equal to one of the original frequencies (e.g., $f_{oa}$). Receiver 84 would then deliver to computer 18 the recovered bit stream and the $f_o$ value associated with the recovered bit stream. Computer 18 would limit access to the authorized data file.

I claim:

1. Apparatus for use at the receiver end of a communication line to distinguish between authorized and unauthorized signals on the communication line, where it is known in advance at the receiver that authorized signals on the communication line are generated by dividing a periodic original signal having a frequency $f_o$ by at least one value so that (i) subsequent multiplication of authorized communication line signals by said at least one value will generate signals that are phase coherent with one another and have a common frequency $f_o$, but (ii) subsequent multiplication of unauthorized communication line signals by said at least one value will generate signals that are not phase coherent with one another, and where it is NOT known in advance at the receiver whether any given data on the communication line is authorized or unauthorized, the apparatus comprising a multiplier for stepping up the frequency of the communication line signals by multiplying them by said at least one value to generate output signals which have frequency $f_o$ and are phase coherent with each other when the communication line signals are authorized, but are phase incoherent when the communication line signals are not authorized, a bandpass filter at frequency $f_o$ for filtering the output signals of the multiplier to build up, as an output signal, a single spectral line at f? , the phase coherence of the output signals of the multiplier permitting more of the spectral energy of the output signals of the multiplier to fall within the passband of the filter in the case of authorized communication line signals than for unauthorized signals, an analyzer for detecting the spectral energy in the spectral line of frequency $f_o$ in the output signal of the bandpass filter and for generating a signal indicative of the phase coherence or incoherence of the communication line signals relative to each other based on the spectral energy, and an information processor for determining whether the line signals are authorized or unauthorized based on the phase coherence or incoherence of the line signals relative to each other as indicated by the signal issued by the analyzer.

2. The apparatus of claim 1 wherein said authorized communication line-signals have different frequencies in a frequency shift keyed modulation system.

3. The apparatus of claim 2 wherein said authorized communication line signals have two frequencies in a frequency shift keyed modulation system.

4. The apparatus of claim 1 wherein said periodic original signal has, at a give time, one of a plurality of known base frequencies, and said one base frequency of said original signal at each said given time is known to said bandpass filter.

5. The apparatus of claim 1 wherein said authorized communication signals represent a bit stream, said authorized communication signals have two periodic components, and said periodic components are generated by binary frequency shift keying based on said bit stream.

6. The apparatus of claim 5 wherein said periodic components of said authorized communications signals are generated by dividing said periodic original signal by either of two integers (M and N) corresponding to "1" valued bits and "0" valued bits in said bit stream.

7. The apparatus of claim 1 wherein said multiplier comprises a harmonic generator for generating harmonics of said periodic components including Mth and Nth harmonics, and said bandpass filter filters the output of said harmonic generator in a narrow passband at frequency $f_o$ 8. The apparatus of claim 1 wherein said authorized communication signals are generated digitally from aid periodic original signal.

9. The apparatus of claim 1 wherein said communication line comprises a band limited channel, said communication line signals being within the passband of said channel, said periodic original signal being outside said passband.

* * * * *